United States Patent
Mitkina et al.

(10) Patent No.: US 12,534,405 B2
(45) Date of Patent: Jan. 27, 2026

(54) SHOTCRETE COMPOSITION

(71) Applicant: Construction Research & Technology GmbH, Trostberg (DE)

(72) Inventors: Tatiana Mitkina, Trostberg (DE); Joachim Dengler, Trostberg (DE)

(73) Assignee: CONSTRUCTION RESEARCH & TECHNOLOGY GMBH, Trostberg (DE)

( * ) Notice: Subject to any disclaimer, the term of this patent is extended or adjusted under 35 U.S.C. 154(b) by 285 days.

(21) Appl. No.: 17/604,501

(22) PCT Filed: Apr. 17, 2020

(86) PCT No.: PCT/EP2020/060920
§ 371 (c)(1),
(2) Date: Oct. 18, 2021

(87) PCT Pub. No.: WO2020/212607
PCT Pub. Date: Oct. 22, 2020

(65) Prior Publication Data
US 2022/0212994 A1 Jul. 7, 2022

(30) Foreign Application Priority Data
Apr. 18, 2019 (EP) .................................... 19170324

(51) Int. Cl.
| | | |
|---|---|---|
| *C04B 22/14* | (2006.01) | |
| *C04B 24/00* | (2006.01) | |
| *C04B 24/06* | (2006.01) | |
| *C04B 24/12* | (2006.01) | |
| *C04B 24/16* | (2006.01) | |
| *C04B 24/26* | (2006.01) | |
| *C04B 28/04* | (2006.01) | |
| *C04B 28/06* | (2006.01) | |
| *C04B 28/08* | (2006.01) | |
| C04B 103/10 | (2006.01) | |
| C04B 103/40 | (2006.01) | |
| C04B 111/00 | (2006.01) | |
| C04B 111/76 | (2006.01) | |

(52) U.S. Cl.
CPC .......... *C04B 24/124* (2013.01); *C04B 22/148* (2013.01); *C04B 24/003* (2013.01); *C04B 24/06* (2013.01); *C04B 24/16* (2013.01); *C04B 24/2647* (2013.01); *C04B 28/04* (2013.01); *C04B 28/06* (2013.01); *C04B 28/065* (2013.01); *C04B 28/08* (2013.01); *C04B 2103/10* (2013.01); *C04B 2103/408* (2013.01); *C04B 2111/00155* (2013.01); *C04B 2111/766* (2013.01)

(58) Field of Classification Search
CPC ... C04B 24/124; C04B 22/148; C04B 24/003; C04B 24/06; C04B 24/16; C04B 24/2647; C04B 28/04; C04B 28/06; C04B 28/065; C04B 28/08; C04B 2103/10; C04B 2103/408; C04B 2111/00155; C04B 2111/766; C04B 22/14; C04B 24/00; C04B 24/12; C04B 24/26; C04B 24/04; C04B 2103/30; C04B 24/126
See application file for complete search history.

(56) References Cited

U.S. PATENT DOCUMENTS

2002/0195026 A1 * 12/2002 Hofmann ............ C04B 40/0039
106/287.32
2021/0122676 A1 * 4/2021 Grassl ..................... C04B 24/04

FOREIGN PATENT DOCUMENTS

| EP | 0568865 A1 * | 11/1993 | | |
|---|---|---|---|---|
| WO | 9818740 A1 | 5/1998 | | |
| WO | 03029163 A2 | 4/2003 | | |
| WO | 2006010407 A1 | 2/2006 | | |
| WO | 2008006410 A1 | 1/2008 | | |
| WO | 2010063777 A1 | 6/2010 | | |
| WO | WO-2017001413 A1 * | 1/2017 | ................ | C01F 7/74 |
| WO | WO-2017212045 A1 * | 12/2017 | ............. | C04B 22/10 |

OTHER PUBLICATIONS

Bridger, P. "Shotcrete 101. From past to present, find out everything you need to know about shotcrete" Concrete Construction. [retrieved from the internet at Nov. 8, 2023 from <URL:https://www.concreteconstruction.net/how-to/construction/shotcrete-101_o>]. (Year: 2013).*

(Continued)

*Primary Examiner* — Amber R Orlando
*Assistant Examiner* — Marites A Guino-O Uzzle
(74) *Attorney, Agent, or Firm* — Curatolo Sidoti & Trillis Co., LPA; Floyd Trillis, III; Salvatore A. Sidoti

(57) ABSTRACT

A shotcrete composition comprising a) a cementitious binder; b) an ettringite formation controller comprising (i) a glyoxylic acid condensate and/or a glyoxylic acid adduct; and c) an alkali-free, aluminum-based shotcrete accelerator. The invention further relates to a process comprising providing a cementitious composition comprising a) a cementitious binder, and b) an ettringite formation controller comprising (i) a glyoxylic acid condensate and/or a glyoxylic acid adduct; admixing an alkali-free, aluminum-based shotcrete accelerator to the cementitious composition to obtain a shotcrete composition; and applying the shotcrete composition onto a surface to obtain a shotcrete structure and allowing the shotcrete structure to harden. The invention also relates to a hardened shotcrete structure obtained by this process.

15 Claims, 5 Drawing Sheets

(56) References Cited

OTHER PUBLICATIONS

EP-0568865-A1, machine translation (Year: 1993).*
International Search Report for Application No. PCT/EP2020/060920 dated May 29, 2020.
Written Opinion for Application No. PCT/EP2020/060920 dated May 29, 2020.
Yuli Wang, et al., Comparison of Effects of Sodium Bicarbonate and Sodium Carbonate on the Hydration and Properties of Portland Cement Paste, Materials, Mar. 28, 2019, p. 1033, vol. 12, Issue 7, MDPI, Basel, Switzerland.
Liyuan Yang, et al., "State-of-art of Research on Liquid Accelerators for Shotcrete", Tunnel Construction, vol. 37, No. 5, May 2017, China Academic Journal Electronic Publishing House.
Office Action mailed on Jun. 30, 2022 for counterpart Chinese Application No. 113905997 A.

* cited by examiner

SHOTCRETE COMPOSITION

CROSS REFERENCE TO RELATED APPLICATIONS

This application is a national stage application of International Application No. PCT/EP2020/060920, filed 17 Apr. 2020, which claims priority from European Application No. 19170324.8, filed 18 Apr. 2019, both of which applications are incorporated herein by reference.

The present invention relates to a shotcrete composition and a method of its application.

Shotcrete (or sprayed concrete) is a mortar or concrete product which is conveyed from delivery equipment through, e.g., a hose, and projected pneumatically at high velocity onto a surface. It has been used to protect exposed rocks from degradation due to weathering and dedication, in addition to providing support to loosened rock blocks in broken or overstressed ground. Commonly, admixtures are introduced to the cement/aggregate mix to improve its physical properties.

In mining applications, there is a desire to reduce the time spent preparing excavations, shafts or tunnels to increase the productivity in such a structure without jeopardizing the workers' safety. In open excavations, when a lift is removed and as the newly exposed ground has limited stand up time, shotcrete is sprayed on first for stabilization and then rock bolts or some other means of support are installed for permanent support. In tunneling and mining, the exposed face is often sprayed with shotcrete until the next round is prepared for blasting. In addition, the tunnel surface is often sprayed with shotcrete until rock bolts or steel rings or concrete segmental linings can be installed.

Conventional shotcrete can set in only a few minutes, but it is relatively slow to harden, taking several days to attain most of its strength. This means there is a significant delay after the shotcrete has been sprayed whilst it hardens until it is safe to resume mining activities in the vicinity of the shotcrete. This delay depends on what is considered to be an acceptable strength the concrete needs to attain. This time delay slows down mining operations and limits the applications in which shotcrete may be used. The time delay could be minimized by using a shotcrete composition which hardens quickly and develops high early strengths. Especially under difficult working conditions like unstable ground, where fast rates of advance are required, or if thick layers have to be sprayed overhead, high early strength of shotcrete is crucial.

Wang et al., Materials 2019, 12, 20133, "Comparison of Effects of Sodium Bicarbonate and Sodium Carbonate on the Hydration and Properties of Portland Cement Paste", discuss sodium carbonates and bicarbonates as accelerators for sprayed concrete.

Another problem in making shotcrete is the trade-off between setting time and early strength development, and the shotcrete's pumpability and sprayability. Improving shotcrete pumpability and sprayability will minimize power consumption and blockages risk.

Also, there is a desire to provide shotcrete which has reduced influence of low temperatures on strength development and, therefore, is suitable, e.g., for use in winter construction.

WO 2017/212045 A1 describes construction chemical compositions comprising a bisulfite adduct of glyoxylic acid or salts thereof and an inorganic binder. The composition is described to advantageously affect mortar properties such as open time, processability, setting and compressive strength.

There is a need for shotcrete compositions with high compressive strength within hours of curing time without compromising their pumpability and sprayability or with even improved pumpability and sprayability. In addition, there is a need for shotcrete compositions which are suitable for shotcreting at colder conditions.

The above problems are solved by a shotcrete composition comprising
  a) a cementitious binder;
  b) an ettringite formation controller comprising (i) a glyoxylic acid condensate and/or a glyoxylic acid adduct; and
  c) an alkali-free, aluminum-based shotcrete accelerator.

The invention also relates to a process comprising
  providing a cementitious composition comprising a) a cementitious binder, and b) an ettringite formation controller comprising (i) a glyoxylic acid condensate and/or a glyoxylic acid adduct;
  admixing an alkali-free, aluminum-based shotcrete accelerator to the cementitious composition to obtain a shotcrete composition; and
  applying the shotcrete composition onto a surface to obtain a shotcrete structure and allowing the shotcrete structure to harden.

In some embodiments, the shotcrete structure is in the form of a shotcrete layer.

The invention further relates to a hardened shotcrete structure obtained by the above-mentioned process.

Upon hydration of a cementitious system, ettringite is generated in a rapid reaction. Ettringite is a calcium aluminum sulfate compound having the formula $Ca_6Al_2(SO_4)_3 \cdot 32\ H_2O$ or alternatively $3\ CaO \cdot Al_2O_3 \cdot 3\ CaSO_4 \cdot 32\ H_2O$. This reaction is responsible for the development of early compressive strength of the cementitious composition. Ettringite forms as long needle-like crystals. The newly formed small needle-like ettringite crystals, however, tend to deteriorate the workability or flowability of the cementitious composition. In addition, ettringite contains 32 moles of water in its stoichiometric formula. This means that upon ettringite formation a significant amount of water is bound in the solid crystals and the flowability of the composition is reduced.

According to the invention, an ettringite formation controller is added to the composition in order to delay the reaction and improve workability. The controller delays the hydration onset by inhibiting the dissolution of the reactive cement components, in particular aluminates, and/or by masking the calcium ions thereby slowing down the hydration reaction.

According to the invention, the ettringite formation controller comprises (i) a glyoxylic acid condensate and/or a glyoxylic acid adduct. It is believed that the glyoxylic acid condensate or the glyoxylic acid adduct suppresses the formation of ettringite from the aluminate phases originating from the cementitious binder by stabilizing the aluminate phases and thereby slowing down the dissolution of the aluminate phases.

In an embodiment, the glyoxylic acid condensate is an amine-glyoxylic acid condensate. The term "amine-glyoxylic acid condensate" is intended to mean a condensate of glyoxylic acid with a compound containing amino or amido groups reactive with aldehydes. Examples of compounds containing aldehyde-reactive amino or amido groups include urea, thiourea, melamine, guanidine, acetoguanamine, benzoguanamine and other acylguanamines and polyacrylamide.

Preferably, the amine-glyoxylic acid condensate is a melamine-glyoxylic acid condensate, a urea-glyoxylic acid condensate, a melamine-urea-glyoxylic acid condensate and/or a polyacrylamide-glyoxylic acid condensate. Urea-glyoxylic acid condensates are particularly preferred.

The amine-glyoxylic acid condensates are obtainable by reacting glyoxylic acid with a compound containing aldehyde-reactive amino or amido groups. The glyoxylic acid can be used as an aqueous solution or as glyoxylic acid salts, preferably glyoxylic acid alkali metal salts. Likewise, the amine compound can be used as salt, for example as guanidinium salts. In general, the amine compound and the glyoxylic acid are reacted in a molar ratio of 0.5 to 2 equivalents, preferably 1 to 1.3 equivalents, of glyoxylic acid per aldehyde-reactive amino or amido group. The reaction is carried out at a temperature of 20 to 120° C., preferably 25 to 80° C. The pH value is from 0 to 7. The viscous products obtained in the reaction can be used as such, adjusted to a desired solids content by dilution or concentration or evaporated to dryness by, e.g., drum-drying, or flash-drying.

In general, the amine-glyoxylic acid condensates have molecular weights in the range of from 500 to 25 000 g/mol, preferably 1000 to 10 000 g/mol, particularly preferred 1000 to 5000 g/mol.

In an embodiment, the glyoxylic acid adduct is a bisulfite adduct of glyoxylic acid or a salt or a mixed salt thereof. The term "bisulfite adduct of glyoxylic acid" is intended to mean an adduct of glyoxylic acid with a compound containing sulfur and oxygen capable of adding an equivalent of bisulfite, i.e. hydrogen sulfite ($HSO_3^-$), to glyoxylic acid.

Preferably, the bisulfite adduct has the general formula (I)

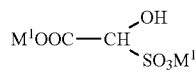

(I)

wherein $M^1$ is independently selected from H or a cation equivalent $K_r$, wherein K is selected from an alkali metal, alkaline earth metal, zinc, copper, iron, aluminum, ammonium or phosphonium cation, or mixtures thereof, and r is 1/v, wherein v is the valency of the cation.

If $M^1$ is a cation equivalent $K_r$, the resulting compound is a salt which also includes mixed salts. In a further embodiment, the salt is selected from an alkali metal, alkaline earth metal, zinc, copper, iron, aluminum, ammonium or phosphonium salt, preferably from an alkali metal salt such as the sodium or potassium salt.

The bisulfite adducts are commercially available or can be prepared by conventional methods which are known to the skilled person. See, e.g., WO 2017/212045 A1 for further details in this regard.

In a preferred embodiment, the ettringite formation controller additionally comprises (ii) a carbonate source. It has surprisingly been found that components (i) and (ii) act in a synergistic fashion. The presence of the carbonate source ensures that the mixing water is initially highly concentrated in carbonate ions. Carbonate ions are believed to inhibit the crystallization of ettringite. The carbonate source may be an inorganic carbonate having an aqueous solubility of $0.1$ $gL^{-1}$ or more. The aqueous solubility of the inorganic carbonate is determined in water at pH 7 and 20° C. These characteristics are well known to those skilled in the art.

The "inorganic carbonate" is intended to mean a salt of carbonic acid, i.e., a salt which is characterized by the presence of a carbonate ion ($CO_3^{2-}$) and/or hydrogen carbonate ion ($HCO_3^-$).

The inorganic carbonate may be suitably selected from alkali metal carbonates such as sodium carbonate or lithium carbonate, and alkaline earth metal carbonates satisfying the required aqueous solubility, such as magnesium carbonate. Further suitable inorganic carbonates include carbonates of nitrogenous bases such as guanidinium carbonate and ammonium carbonate.

Alternatively, the carbonate source is selected from organic carbonates. "Organic carbonate" denotes an ester of carbonic acid. The organic carbonate is hydrolyzed in the presence of the cementitious system to release carbonate ions. In an embodiment, the organic carbonate is selected from ethylene carbonate, propylene carbonate, glycerol carbonate, dimethyl carbonate, di(hydroxyethyl)carbonate or a mixture thereof, preferably ethylene carbonate, propylene carbonate, and glycerol carbonate or a mixture thereof, and in particular ethylene carbonate and/or propylene carbonate. Mixtures of inorganic carbonates and organic carbonates can as well be used.

The weight ratio of component (i) to component (ii) is typically in the range of about 10:1 to about 1:10, preferably about 5:1 to about 1:5 or about 1:1 to about 1:4.

In an embodiment, the ettringite formation controller further comprises
(iii) a component selected from
polycarboxylic acids or salts thereof whose milliequivalent number of carboxyl groups is 5.00 meq/g or higher, preferably 5.00 to 15.00 meq/g, assuming all the carboxyl groups to be in unneutralized form; and
α-hydroxy carboxylic acids or salts thereof.

By the term polycarboxylic acid, as used herein, is meant a compound or polymer having two or more carboxyl groups to the molecule.

Suitable polycarboxylic acids are
low molecular weight polycarboxylic acids (having a molecular weight of, e.g., 500 g/mol or lower), in particular aliphatic polycarboxylic acids, such as oxalic acid, malonic acid, succinic acid, glutaric acid, adipic acid, pimelic acid, fumaric acid, maleic acid, itaconic acid, citraconic acid, mesaconic acid, or malic acid;
phosphonoalkylcarboxylic acids, such as 1-phosphonobutane-1,2,4-tricarboxylic acid, 2-phosphonobutane-1,2,4-tricarboxylic acid, 3-phosphonobutane-1,2,4-tricarboxylic acid, 4-phosphonobutane-1,2,4-tricarboxylic acid, 2,4-diphosphonobutane-1,2,4-tricarboxylic acid, 2-phosphonobutane-1,2,3,4-tetracarboxylic acid, 1-methyl-2-phosphonopentane-1,2,4-tricarboxylic acid, or 1,2-phosphonoethane-2-dicarboxylic acid;
amino carboxylic acids, such as ethylenediamine tetra acetic acid, or nitrilotriacetic acid;
polymeric carboxylic acids, such as homopolymers of acrylic acid, homopolymers of methacrylic acid, polymaleic acid, copolymers such as ethylene/acrylic acid copolymer and ethylene/methacrylic acid copolymer; copolymers of acrylic acid and/or methacrylic acid with sulfo or sulfonate group containing monomers. In an embodiment, the sulfo or sulfonate group containing monomers are selected from the group of vinylsulfonic acid, (meth)allylsulfonic acid, 4-vinylphenylsulfonic acid or 2-acrylamido-2-methylpropylsulfonic acid (ATBS), with ATBS being particularly preferred. It is possible that one more of the before mentioned sulfo or sulfonate group containing monomers are contained in the copolymers.

In general, the molecular weight of the polymeric carboxylic acids is in the range of from 1000 to 30 000 g/mol, preferably 1000 to 10 000 g/mol.

Suitable α-hydroxy carboxylic acids or salts thereof include tartaric acid, citric acid, glycolic acid, gluconic acid, and their salts and mixtures thereof. Sodium gluconate is particularly preferred.

The weight ratio of component (i) to component (iii) is in general in the range from about 10:1 to about 1:10, preferably about 5:1 to about 1:5 or about 3:1 to about 1:1.

Preferably, the dosage of (i), or the sum of (i) and (ii), or the sum of (i), (ii) and (iii) is from 0.05 to 3%, preferably 0.1 to 1%, relative to the weight of cementitious binder.

The ettringite formation controller can be present as a solution or dispersion, in particular an aqueous solution or dispersion. The solution or dispersion suitably has a solids content of 10 to 50% by weight, in particular 25 to 35% by weight. Alternatively, the ettringite formation controller can be present as a powder which is obtainable, e.g., by drum-drying, spray-drying or flash-drying. The ettringite formation controller may be introduced into the mixing water or introduced during the mixing of the mortar or concrete before addition of water.

The weight ratio of ettringite formation controller (b) to cementitious binder (a) in the shotcrete composition is typically in the range of about 0.05 to about 10%, preferably about 0.1 to about 4% or about 0.2 to about 3%.

Typically, a cementitious composition is provided which comprises a) the cementitious binder, and b) the ettringite formation controller as defined above. The cementitious composition may comprise additional ingredients which are conventional in the art and which are exemplified below. The cementitious composition is admixed with water. The cementitious composition admixed with water is also referred to as "cement paste".

An alkali-free, aluminum-based shotcrete accelerator is admixed to the cementitious composition to obtain the shotcrete composition. According to European regulations (PREN 934-5 "Admixtures for Sprayed Concrete—Definitions, Requirements, Conformity, Marking and Labelling"), an accelerator is classified as "alkali-free" when the concentration of sodium and potassium, expressed as equivalents of $Na_2O$, is lower than 1%. Lithium is also an alkali metal, however the scientific literature shows that it does not negatively affect the concrete and therefore it is not considered in the calculation of equivalents of $Na_2O$. "Alkali-free" accelerators may comprise alkaline earth metal compounds, such as calcium salts, magnesium salts, and mixtures thereof.

Typically, the alkali-free, aluminum-based shotcrete accelerator is comprised in a shotcrete accelerator formulation for ease of handling. Beside the alkali-free, aluminum-based shotcrete accelerator, the shotcrete accelerator formulation contains additives to provide shelf stability and other desirable properties to the shotcrete accelerator formulation. The shotcrete accelerator formulation can be in liquid form or solid form, such as powder form.

As shown in the examples herein, the use of alkali-free accelerators has significant advantages over alkali containing accelerators with regard to early strength of shotcrete compositions. Moreover, disadvantages associated with the presence of alkali containing accelerators may be avoided.

In particular, alkali containing shotcrete accelerators, such as alkali metal aluminates, alkaline earth metal aluminates, alkali metal silicates, alkaline earth metal silicates and mixtures thereof, may negatively affect long-term mechanical strengths. Moreover, due to their alkaline nature, they are skin irritants and contact with the eyes must be rigorously avoided. Therefore, particular protective devices are requested for the workers' safety. Furthermore, alkali metal substances react with aggregates and could favor alkali silica reaction which impairs the concrete properties. Additionally, when the alkali content in shotcrete is too high, it can lead to the corrosion of steel reinforcements. Finally, alkali containing shotcrete accelerators release alkaline substances that, by increasing the pH of ground waters, could be dangerous polluting agents.

The alkali-free accelerators of the inventive compositions are based on aluminum compounds, e.g., aluminum salts such as sulfates, nitrates, fluorides and/or their hydrates; aluminum oxides; and aluminum hydroxides. The alkali-free accelerators may be selected from aluminum salts, aluminum complexes, aluminum oxides, aluminum hydroxides, and mixtures thereof. Preferably, the alkali-free accelerator is selected from aluminum salts, especially aluminum sulfates.

The weight ratio of cementitious binder (a) to alkali-free, aluminum-based shotcrete accelerator (c) in the shotcrete composition is typically in the range of about 1000:1 to about 3:1, preferably about 100:1 to about 10:1 or about 35:1 to about 5:1.

Formulations of alkali-free shotcrete accelerators may be stabilized by various chemicals. Examples of such stabilizers include organic acids such as carboxylic acids, dicarboxylic acids, hydroxycarboxylic acids, aminocarboxylic acids, phosphoric acid, phosphorous acid, phosphonic acids, sulfamic acid; inorganic acids such as sulfuric acid, nitrous acid, phosphoric acid, phosphorous acid, hydrofluoric acid, hexafluorosilicic acid, and mixtures thereof; urea; polymeric stabilizers, such as polyacrylamides, polycarboxylates, polysulfonates, and copolymers and mixtures thereof; aluminosilicates such as attapulgite, sepiolite and bentonite; and colloidal silica. Furthermore, shotcrete accelerators may additionally comprise calcium and magnesium compounds such as for example sulfates, as well as amines, for example alkanolamines such as diethanolamine, triethanolamine, diisopropanolamine and triisopropanolamine and mixtures thereof.

Suitable alkali-free accelerators and their manufacture are described, e.g., in WO 2008/006410 A1, WO 2010/063777 A1, WO 98/18740 A1, WO 03/029163 A2 and EP 1 167 317 A1.

Preferably, the shotcrete composition according to the invention additionally comprises at least one dispersant for inorganic binders, especially a dispersant for cementitious mixtures like concrete or mortar. Preferably, the dispersant is included in the cementitious composition prior to admixture of the alkali-free, aluminum-based shotcrete accelerator.

Examples of useful dispersants include
comb polymers having a carbon-containing backbone to which are attached pendant cement-anchoring groups and polyether side chains,
non-ionic comb polymers having a carbon-containing backbone to which are attached pendant hydrolysable groups and polyether side chains, the hydrolysable groups upon hydrolysis releasing cement-anchoring groups,
sulfonated melamine-formaldehyde condensates,
lignosulfonates,
sulfonated ketone-formaldehyde condensates, sulfonated naphthalene-formaldehyde condensates, phosphonate containing dispersants, phosphate containing dispersants, and mixtures thereof.

In an embodiment, the dispersant is a comb polymer having a carbon-containing backbone to which are attached pendant cement-anchoring groups and polyether side chains. The cement-anchoring groups are anionic and/or anionogenic groups such as carboxylic groups, phosphonic or phosphoric acid groups or their anions. Anionogenic groups are the acid groups present in the polymeric dispersant, which can be transformed to the respective anionic group under alkaline conditions.

Preferably, the structural unit comprising anionic and/or anionogenic groups is one of the general formulae (Ia), (Ib), (Ic) and/or (Id):

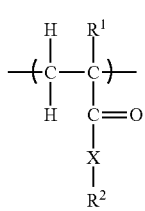

Ia wherein $R^1$ is H, $C_1$-$C_4$ alkyl, $CH_2COOH$ or $CH_2CO$—$X$—$R^{3A}$, preferably H or methyl;

X is NH—$(C_{n1}H_{2n1})$ or O—$(C_{n1}H_{2n1})$ with n1=1, 2, 3 or 4, or a chemical bond, the nitrogen atom or the oxygen atom being bonded to the CO group;

$R^2$ is OM, $PO_3M_2$, or O—$PO_3M_2$; with the proviso that X is a chemical bond if $R^2$ is OM;

$R^{3A}$ is $PO_3M_2$, or O—$PO_3M_2$;

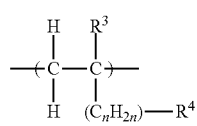

Ib wherein $R^3$ is H or $C_1$-$C_4$ alkyl, preferably H or methyl;

n is 0, 1, 2, 3 or 4;

$R^4$ is $PO_3M_2$, or O—$PO_3M_2$;

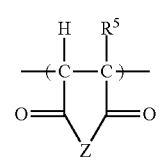

Ic wherein $R^5$ is H or $C_1$-$C_4$ alkyl, preferably H;

Z is O or $NR^7$;

$R^7$ is H, $(C_{n1}H_{2n1})$—OH, $(C_{n1}H_{2n1})$—$OP_3M_2$, $(C_{n1}H_{2n1})$—$OPO_3M_2$, $(C_6H_4)$—$PO_3M_2$, or $(C_6H_4)$—$OPO_3M_2$, and n1 is 1, 2, 3 or 4;

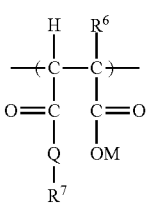

Id wherein $R^6$ is H or $C_1$-$C_4$ alkyl, preferably H;

Q is $NR^7$ or O;

$R^7$ is H, $(C_{n1}H_{2n1})$—OH, $(C_{n1}H_{n21})$—$PO_3M_2$, $(C_{n1}H_{2n1})$—$OPO_3M_2$, $(C_6H_4)$—$PO_3M_2$, or $(C_6H_4)$—$OPO_3M_2$, n1 is 1, 2, 3 or 4; and where each M independently is H or a cation equivalent.

Preferably, the structural unit comprising a polyether side chain is one of the general formulae (IIa), (IIb), (IIc) and/or (IId):

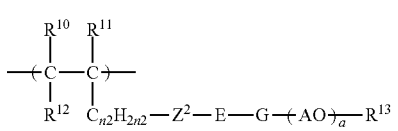

IIa wherein $R^{10}$, $R^{11}$ and $R^{12}$ independently of one another are H or $C_1$-$C_4$ alkyl, preferably H or methyl;

$Z^2$ is O or S;

E is $C_2$-$C_6$ alkylene, cyclohexylene, $CH_2$-$C_6H_{10}$, 1,2-phenylene, 1,3-phenylene or 1,4-phenylene;

G is O, NH or CO—NH; or

E and G together are a chemical bond;

A is $C_2$-$C_5$ alkylene or $CH_2CH(C_6H_5)$, preferably $C_2$-$C_3$ alkylene;

$n_2$ is 0, 1, 2, 3, 4 or 5;

a is an integer from 2 to 350, preferably 10 to 150, more preferably 20 to 100;

$R^{13}$ is H, an unbranched or branched $C_1$-$C_4$ alkyl group, CO—$NH_2$ or $COCH_3$;

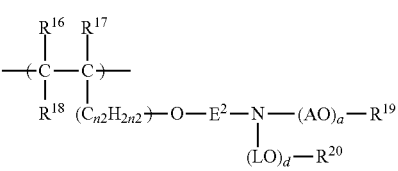

IIb wherein $R^{16}$, $R^{17}$ and $R^{18}$ independently of one another are H or $C_1$-$C_4$ alkyl, preferably H;

$E^2$ is $C_2$-$C_6$ alkylene, cyclohexylene, $CH_2$—$C_6H_{10}$, 1,2-phenylene, 1,3-phenylene, or 1,4-phenylene, or is a chemical bond;

A is $C_2$-$C_5$ alkylene or $CH_2CH(C_6H_5)$, preferably $C_2$-$C_3$ alkylene;

n2 is 0, 1, 2, 3, 4 or 5;

L is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

d is an integer from 1 to 350, preferably 10 to 150, more preferably 20 to 100;

$R^{19}$ is H or $C_1$-$C_4$ alkyl; and $R^{20}$ is H or $C_1$-$C_4$ alkyl;

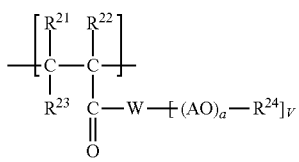

IIc wherein $R^{21}$, $R^{22}$ and $R^{23}$ independently are H or $C_1$-$C_4$ alkyl, preferably H;

W is O, $NR^{26}$, or is N;

V is 1 if W=O or $NR^{26}$, and is 2 if W=N;

A is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

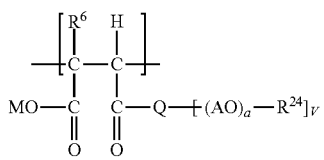

IId wherein $R^6$ is H or $C_1$-$C_4$ alkyl, preferably H;

Q is $NR^{10}$, N or O;

V is 1 if Q=O or $NR^{10}$ and is 2 if Q=N;

$R^{10}$ is H or $C_1$-$C_4$ alkyl;

A is $C_2$-$C_5$ alkylene or $CH_2CH(C_6H_5)$, preferably $C_2$-$C_3$ alkylene; and a is an integer from 2 to 350, preferably 10 to 150, more preferably 20 to 100;

where each M independently is H or a cation equivalent.

The molar ratio of structural units (I) to structural units (II) varies from 1:3 to about 10:1, preferably 1:1 to 10:1, more preferably 3:1 to 6:1. The polymeric dispersants comprising structural units (I) and (II) can be prepared by conventional methods, for example by free radical polymerization. The preparation of the dispersants is, for example, described in EP 0 894 811, EP 1 851 256, EP 2 463 314, and EP 0 753 488.

A number of useful dispersants contain carboxyl groups, salts thereof or hydrolysable groups releasing carboxyl groups upon hydrolysis. Preferably, the milliequivalent number of carboxyl groups contained in these dispersants (or of carboxyl groups releasable upon hydrolysis of hydrolysable groups contained in the dispersant) is 4.90 meq/g or lower, assuming all the carboxyl groups to be in unneutralized form.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

A further class of suitable comb polymers having a carbon-containing backbone to which are attached pendant cement-anchoring groups and polyether side chains comprise structural units (III) and (IV):

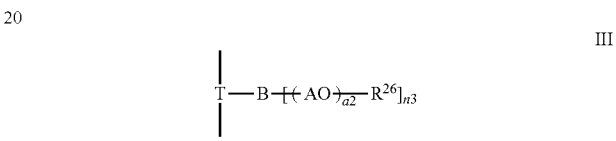

III wherein

T is phenyl, naphthyl or heteroaryl having 5 to 10 ring atoms, of which 1 or 2 atoms are heteroatoms selected from N, O and S;

n3 is 1 or 2;

B is N, NH or O, with the proviso that n3 is 2 if B is N and n3 is 1 if B is NH or O;

A is $C_2$-$C_5$ alkylene or $CH_2CH(C_6H_5)$, preferably $C_2$-$C_3$ alkylene;

a2 is an integer from 1 to 300;

$R^{26}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (IVa) and (IVb):

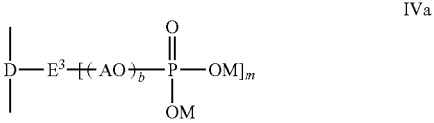

IVa wherein

D is phenyl, naphthyl or heteroaryl having 5 to 10 ring atoms, of which 1 or 2 atoms are heteroatoms selected from N, O and S;

$E^3$ is N, NH or O, with the proviso that m is 2 if $E^3$ is N and m is 1 if $E^3$ is NH or O;

A is $C_2$-$C_5$ alkylene or $CH_2CH(C_6H_5)$, preferably $C_2$-$C_3$ alkylene;

b is an integer from 0 to 300;

M independently is H or a cation equivalent;

IVb wherein
V² is phenyl or naphthyl and is optionally substituted by 1 or two radicals selected from $R^8$, OH, $OR^8$, $(CO)R^8$, COOM, COORS, $SO_3R^8$ and $NO_2$;
$R^{7A}$ is COOM, $OCH_2COOM$, $SO_3M$ or $OPO_3M_2$;
M is H or a cation equivalent; and
$R^8$ is $C_1$-$C_4$ alkyl, phenyl, naphthyl, phenyl-$C_1$-$C_4$ alkyl or $C_1$-$C_4$ alkylphenyl.

Polymers comprising structural units (III) and (IV) are obtainable by polycondensation of an aromatic or heteroaromatic compound having a polyoxyalkylene group attached to the aromatic or heteroaromatic core, an aromatic compound having a carboxylic, sulfonic or phosphate moiety, and an aldehyde compound such as formaldehyde.

In an embodiment, the dispersant is a non-ionic comb polymer having a carbon-containing backbone to which are attached pendant hydrolysable groups and polyether side chains, the hydrolysable groups upon hydrolysis releasing cement-anchoring groups. Conveniently, the structural unit comprising a polyether side chain is one of the general formulae (IIa), (IIb), (IIc) and/or (IId) discussed above. The structural unit having pendant hydrolysable groups is preferably derived from acrylic acid ester monomers, more preferably hydroxyalkyl acrylic monoesters and/or hydroxyalkyl diesters, most preferably hydroxypropyl acrylate and/or hydroxyethyl acrylate. The ester functionality will hydrolyze to (deprotonated) acid groups upon exposure to water at preferably alkaline pH, which is provided by mixing the cementitious binder with water, and the resulting acid functional groups will then form complexes with the cement component.

Suitable sulfonated melamine-formaldehyde condensates are of the kind frequently used as plasticizers for hydraulic binders (also referred to as MFS resins). Sulfonated melamine-formaldehyde condensates and their preparation are described in, for example, CA 2 172 004 A1, DE 44 1 1 797 A1, U.S. Pat. Nos. 4,430,469, 6,555,683 and CH 686 186 and also in Ullmann's Encyclopedia of Industrial Chemistry, 5th Ed., vol. A2, page 131, and Concrete Admixtures Handbook—Properties, Science and Technology, 2. Ed., pages 411, 412. Preferred sulfonated melamine-formaldehyde condensates encompass (greatly simplified and idealized) units of the formula

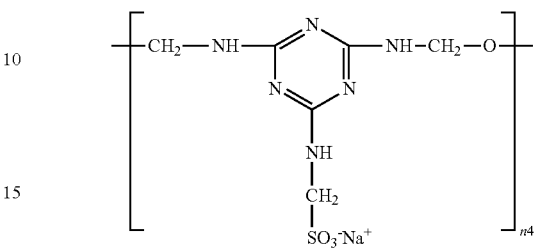

in which n4 stands generally for 10 to 300. The molar weight is situated preferably in the range from 2500 to 80 000. Additionally, to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. An example of melaminesulfonate-formaldehyde condensates are the Melment® products distributed by BASF Construction Solutions GmbH.

Suitable lignosulfonates are products which are obtained as by-products in the paper industry. They are described in Ullmann's Encyclopedia of Industrial Chemistry, 5th Ed., vol. A8, pages 586, 587. They include units of the highly simplified and idealizing formula

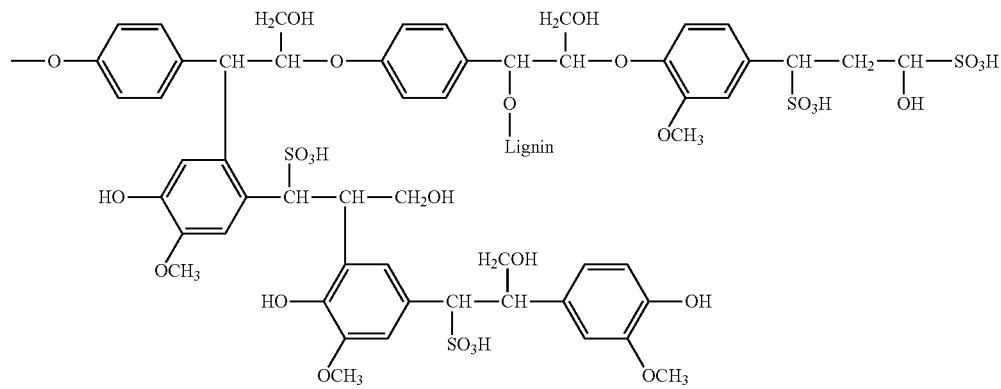

Lignosulfonates have molar weights of between 2000 and 100 000 g/mol. In general, they are present in the form of their sodium, calcium and/or magnesium salts. Examples of suitable lignosulfonates are the Borresperse products distributed by Borregaard LignoTech, Norway.

Suitable sulfonated ketone-formaldehyde condensates are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024):

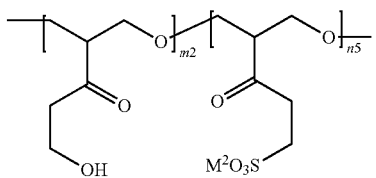

where m2 and n5 are generally each 10 to 250, $M^2$ is an alkali metal ion, such as $Na^+$, and the ratio m2: n5 is in general in the range from about 3:1 to about 1:3, more particularly about 1.2:1 to 1:1.2. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated acetone-formaldehyde condensates are the Melcret K1L products distributed by BASF Construction Solutions GmbH.

Suitable sulfonated naphthalene-formaldehyde condensates are products obtained by sulfonation of naphthalene and subsequent polycondensation with formaldehyde. They are described in references including Concrete Admixtures Handbook—Properties, Science and Technology, 2. Ed., pages 411-413 and in Ullmann's Encyclopedia of Industrial Chemistry, 5th Ed., vol. A8, pages 587, 588. They comprise units of the formula

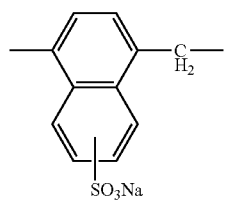

Typically, molar weights (Mw) of between 1000 and 50 000 g/mol are obtained. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated β-naphthalene-formaldehyde condensates are the Melcret 500 L products distributed by BASF Construction Solutions GmbH.

Generally, phosphonate containing dispersants incorporate phosphonate groups and polyether side groups.

Suitable phosphonate containing dispersants are those according to the following formula

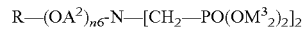

wherein
R is H or a hydrocarbon residue, preferably a $C_1$-$C_{15}$ alkyl radical,
$A^2$ is independently $C_2$-$C_{18}$ alkylene, preferably ethylene and/or propylene, most preferably ethylene,
n6 is an integer from 5 to 500, preferably 10 to 200, most preferably 10 to 100, and
$M^3$ is H, an alkali metal, ½ alkaline earth metal and/or an amine.

The cementitious binder is suitably selected from Portland cement, calcium aluminate cement and/or sulfoaluminate cement.

The mineralogical phases are indicated by their usual name followed by their cement notation. The primary compounds are represented in the cement notation by the oxide varieties: C for CaO, S for $SiO_2$, A for $Al_2O_3$, $ for $SO_3$, F for $Fe_2O_3$, H for $H_2O$; this notation is used throughout.

The term "Portland cement" denotes any cement compound containing Portland clinker, especially CEM I, II, III, IV and V within the meaning of standard EN 197-1, paragraph 5.2. A preferred cement is ordinary Portland cement (OPC) according to DIN EN 197-1 which may either contain calcium sulfate (<7% by weight) or is essentially free of calcium sulfate (<1% by weight). The phases constituting Portland cement mainly are alite ($C_3S$), belite ($C_2S$), calcium aluminate ($C_3A$), calcium ferroaluminate ($C_4AF$) and other minor phases. The alite ($C_3S$) provides primarily strength properties.

Calcium aluminate cement (also referred to as high aluminate cement) means a cement containing calcium aluminate phases. The term "aluminate phase" denotes any mineralogical phase resulting from the combination of aluminate (of chemical formula $Al_2O_3$, or "A" in cement notation), with other mineral species. The amount of alumina (in form of $Al_2O_3$) is ≥30% by weight of the total mass of the aluminate-containing cement as determined by means of X-ray fluorescence (XRF). More precisely, said mineralogical phase of aluminate type comprises tricalcium aluminate ($C_3A$), monocalcium aluminate (CA), mayenite ($C_{12}A_7$), tetracalcium aluminoferrite ($C_4AF$), or a combination of several of these phases.

Sulfoaluminate cement has a content of ye'elimite (of chemical formula $4CaO \cdot 3Al_2O_3 \cdot SO_3$ or $C_4A_3$$ in cement notation) of greater than 15% by weight.

In an embodiment, the cementitious binder comprises a mixture of Portland cement and aluminate cement, or a mixture of Portland cement and sulfoaluminate cement or a mixture of Portland cement, aluminate cement and sulfoaluminate cement.

In an embodiment, where the cementitious binder contains an aluminate-containing cement, the cementitious composition may additionally contain at least one calcium sulfate source. The calcium sulfate source may be selected from calcium sulfate dihydrate, anhydrite, α- and β-hemihydrate, i.e. α-bassanite and β-bassanite, or mixtures thereof. Preferably the calcium sulfate source is α-bassanite and/or β-bassanite. In general, the calcium sulfate source is comprised in an amount of about 1 to about 20 wt.-%, based on the weight of the aluminate-containing cement. In an embodiment, the construction chemical composition additionally contains at least one alkali metal sulfate like potassium sulfate or sodium sulfate, or aluminum sulfate.

The shotcrete compositions may also contain latent hydraulic binders and/or pozzolanic binders. Typically, these latent hydraulic binders and/or pozzolanic binders are included in the cementitious composition prior to admixture of the alkali-free, aluminum-based shotcrete accelerator. For the purposes of the present invention, a "latent hydraulic binder" is preferably a binder in which the molar ratio (CaO+MgO):$SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, rice husk ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2$ $g^{-1}$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly, pure metakaolin comprises about 54% by weight of $SiO_2$ and about 46% by weight of $Al_2O_3$.

For the purposes of the present invention, aluminosilicates are the above-mentioned reactive compounds based on $SiO_2$ in conjunction with $Al_2O_3$ which harden in an aqueous alkali environment. It is of course not essential here that silicon and aluminum are present in oxidic form, as is the case by way of example in $Al_2Si_2O_7$. However, for the purposes of quantitative chemical analysis of aluminosilicates it is usual to state the proportions of silicon and aluminum in oxidic form (i.e. as "$SiO_2$" and "$Al_2O_3$").

The cementitious composition can be for example concrete, mortar or grouts. The term "mortar" or "grout" denotes a cement paste which contains fine aggregates, i.e. aggregates whose diameter is between 150 μm and 4 mm (for example sand), and optionally very fine granulates. A grout is a mixture of sufficiently low viscosity for filling in voids or gaps. Mortar viscosity is high enough to support not only the mortar's own weight but also that of masonry placed above it. The term "concrete" denotes a cement paste which contains coarse aggregates, i.e. aggregates with a diameter of greater than 4 mm.

The aggregate in this invention can be for example silica, quartz, sand, crushed marble, glass spheres, granite, basalt, limestone, sandstone, calcite, marble, serpentine, travertine, dolomite, feldspar, gneiss, alluvial sands, any other durable aggregate, and mixtures thereof. The aggregates are often also called fillers and in particular do not work as a binder.

The shotcrete composition may further comprise additives such as:
  grinding aids, like amines, amino alcohols, glycols, glycol derivatives, glycerol, glycerol derivatives, molasses, corn syrup;
  nucleating agents, like calcium silicate hydrate compounds in finely grained form;
  strength enhancers, like alkali metal hydroxides, alkaline earth metal hydroxides, alkali metal oxides, alkaline earth metal oxides, alkali metal nitrates, alkaline earth metal nitrates, alkali metal nitrites, alkaline earth metal nitrites, alkali metal thiocyanates, alkaline earth metal thiocyanates, alkali metal halides alkaline earth metal halides and alkaline earth metal formates;
  set retarders like sucrose, glucose, polymeric sugars and phosphonic acids;
  mechanical reinforcement, like synthetic polymeric fibers (for example polypropylene), natural fibers, steel fibers, or meshes of these materials;

stabilizers or thickeners like cellulose ethers and cellulose derivatives, starch, starch ethers and other starch derivatives, xanthan gums, welan gums, diutan gums, high molecular weight polyacrylamides and copolymers thereof comprising acrylic acid and/or ATBS;

polymer dispersions in liquid form or in solid form, such as powder form, like polyacrylates, styrene-butadiene copolymers and ethylene-vinyl acetate copolymers; and mixtures thereof.

Typically, these additives are included in the cementitious composition prior to admixing the alkali-free, aluminum-based shotcrete accelerator.

The process according to the invention comprises:
providing a cementitious composition comprising a) a cementitious binder, and b) an ettringite formation controller comprising (i) a glyoxylic acid condensate and/or a glyoxylic acid adduct;
admixing an alkali-free, aluminum-based shotcrete accelerator to the cementitious composition to obtain a shotcrete composition; and
applying the shotcrete composition onto a surface to obtain a shotcrete structure and allowing the shotcrete structure to harden.

Preferably, the shotcrete composition is pneumatically projected onto the surface.

In one embodiment, the alkali-free, aluminum-based shotcrete accelerator or shotcrete accelerator formulation is admixed to the cementitious composition using a static mixing device, such as an extruder or a standard sprayed concrete nozzle, or a dynamic mixing device, such as a standard mechanical mixer like a concrete mixer. The shotcrete accelerator formulation may be admixed to the cementitious composition in the form of an aqueous solution, in the form of an aqueous suspension, in the form of a solid, or a mixture of these forms.

There are two basic shotcreting technologies, for both of which the present process is applicable: the "dry" process, in which a mixture of cement, fine and/or coarse aggregates and a powder accelerator is pneumatically conveyed through a nozzle to a delivery hose where water is added through a water ring to the essentially dry materials; and the "wet" process, in which the cement, aggregates and water are mixed to a plastic consistency before being conveyed hydraulically to the nozzle where compressed air is added to pneumatically project the wet material onto the surface. However, further "mixed" shotcreting technologies exist.

In one embodiment, the shotcrete composition of the invention can be used for 3D-printing of various articles, which can be used for construction, decorative and further purposes.

The invention will be described in more detail by the accompanying drawings and the subsequent examples.

EXAMPLES

A.) Materials

Figure 1A:
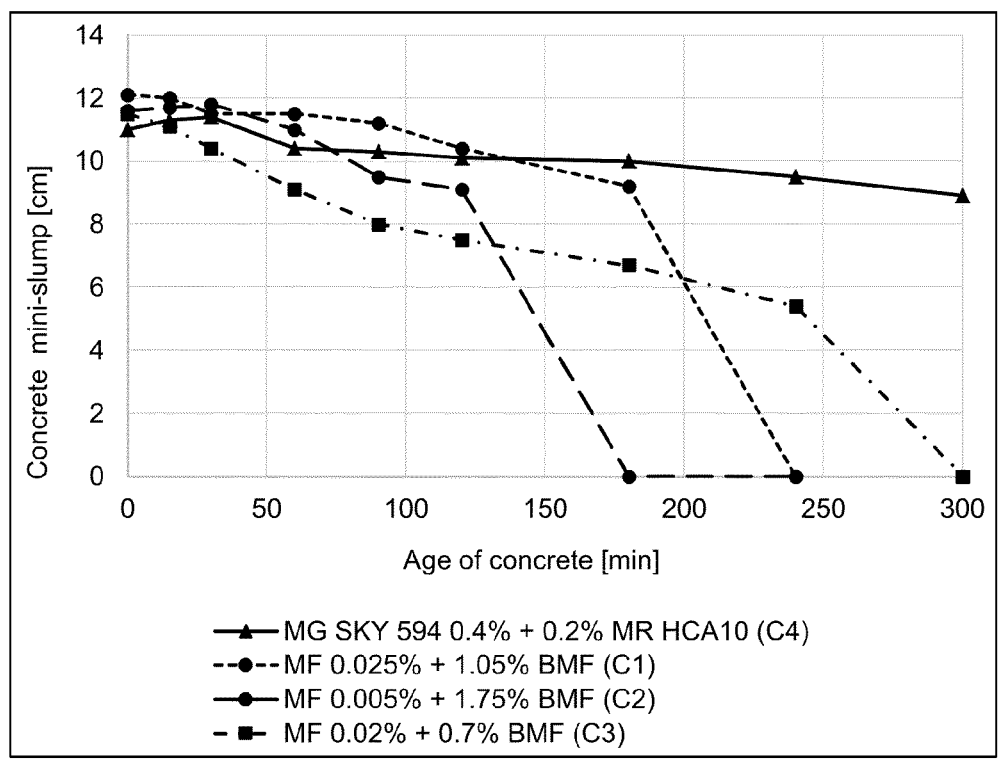
FIGS. 1a and 1b show the experimental results of mini-slump tests of concrete mixes.

Two typical shotcrete cement types from Germany and Austria were used: Mergelstetten CEM I 52,5R and a mixed cement 2:1(w/w) Eiberg CEM 152,5N:Fluasit (the latter is a mix of limestone, slag & fly ash). Both cement types comprise Portland cement clinker and a sulfate source.

As plasticizers MasterGlenium SKY 594 (further abbreviated as MG SKY 594 or SKY 594) and Melflux 6680L (further abbreviated as MF), both available from BASF Construction Solutions GmbH, were used. Both MasterGlenium SKY 594 and Melflux 6680L are polycarboxylate ether (PCE) based plasticizers.

In the reference mixes, hydration control additive MasterRoc HCA 10 (further abbreviated as MR HCA 10 or HCA 10), available from BASF Construction Solutions GmbH, was used. MasterRoc HCA 10 is an aqueous solution of organic acids comprising phosphonic acid and citric acid.

As sprayed concrete accelerators MasterRoc SA 160 and SA 167, both available from BASF Construction Solutions GmbH, were used. Both MasterRoc SA 160 and SA 167 are aqueous suspension type alkali-free accelerators based on aluminum sulfate with solid content in the range of 50±4% and 60±5% correspondingly. As reference accelerators, sodium aluminate as an aqueous solution with a solid content of 40%, and sodium silicate as an aqueous solution with a solid content of 41.5%, both of which are alkali containing accelerators, were included in the experiments.

A glyoxylic acid urea condensate was synthesized as follows: Glyoxylic acid (1.2 g of glyoxylic acid, 50 wt.-% solution in water) was charged into a reaction vessel and aqueous potassium hydroxide (40 wt.-%) was added until a pH value of 5 was reached. 1 g of urea was added and the mixture was heated to 80° C. After 7 h, the highly viscous substance was analyzed by gel permeation chromatography method (GPC) as described below. The thus obtained glyoxylic acid urea condensate is an aqueous solution with a solids content of 49.3%.

An ettringite formation controller was prepared according to the following method:

BMF: The glyoxylic acid urea condensate was mixed with sodium gluconate and sodium carbonate in the weight proportion of solids/actives 3:1:3.

B.) Analytical Methods

Gel Permeation Chromatography (GPC)

Column combination: OH-Pak SB-G, OH-Pak SB 804 HQ and OH-Pak SB 802.5 HQ by Shodex, Japan; eluent: 80 vol.-% aqueous solution of $HCO_2NH_4$ (0.05 mol/l) and 20 vol.-% acetonitrile; injection volume 100 µl; flow rate 0.5 ml/min. The molecular weight calibration was performed with poly(acrylate) standards for the RI detector, purchased from PSS Polymer Standards Service, Germany.

C.) Application Tests

C.1) Concrete Tests

Concrete mixes were prepared on the basis of the compositions according to the following table.

|  | Base Composition | |
|---|---|---|
| Component | B1 | B2 |
| Cement (2:1(w/w) Eiberg CEMI 52,5N:Fluasit) | 680 g | — |
| Cement (Mergelstetten CEMI 52,5R) | — | 670 g |
| Norm sand (DIN EN196-1) | 1350 g | 1350 g |
| Grit (2-5 mm), washed, limestone-based, DIN EN 12620:2002 | 900 g | 900 g |
| Water (total amount) | 293.9 g | 288.1 g |

8 concrete mixes were prepared, comprising a base composition as well as the components according to the following table.

| | Concrete Mix | | | | | | | |
|---|---|---|---|---|---|---|---|---|
| | C1 | C2 | C3 | C4 * | C5 | C6 | C7 | C8 * |
| | Base Composition | | | | | | | |
| | B1 | B1 | B1 | B1 | B2 | B2 | B2 | B2 |
| | Further Components [wt.-%] | | | | | | | |
| Plasticizer (MG SKY 594) ** | — | — | — | 0.4 | — | — | — | 0.3 |
| Plasticizer (Melflux 6680L) ** | 0.025 | 0.005 | 0.02 | — | 0.06 | 0.005 | 0.04 | — |
| Hydration control additive (MasterRoc HCA 10) *** | — | — | — | 0.2 | — | — | — | — |
| Ettringite formation controller (BMF) ** | 1.05 | 1.75 | 0.7 | — | 0.7 | 1.75 | 1.05 | — |

* comparative example
** wt.-% of the sum of solids of active components relative to the weight of cement (bwoc)
*** wt.-% of aqueous solution relative to the weight of cement (bwoc)

Concrete mixes C1 to C8 were prepared by mixing all components and slump retention was evaluated.

Concrete Mixing Procedure:

The concrete mixing was performed in a Hobart mixer with double mixing action (shaft and planetary) using a bowl with a capacity of 4.7 liters. Sand, grit and cement were placed into the bowl and mixed in the dry state at speed 1. Subsequently, 80% of the water were added and the resulting mixture was mixed at speed 1 for further 2 min. Thereafter, an aqueous solution of the plasticizer and, if applicable, MasterRoc HCA 10, in the remaining 20% of the water were added and the mixture was mixed again for 2 min at speed 1.

For the mixtures with ettringite formation controller BMF, a modified mixing procedure was used, wherein plasticizer and ettringite formation controller both are dissolved in 100% of the mixing water for the concrete mix and added at once after initial premixing of dry components. The further mixing procedure is the same as in the above-mentioned case.

When the mixture is further used for slump retention assessment, the concrete mix is transferred to a mini-slump cone (see the description of the mini-slump test below) after a total of 5 min of mixing.

When the mixture is further mixed with an accelerator, the speed of mixing is switched to speed 2 after a total of 5 min and the accelerator is injected into the mixture via syringe as fast as possible. After 15 seconds of mixing with the accelerator, the mixtures are filled into 4×4×16 cm prism molds, densified at a vibrating table for 30 seconds, sealed with plastic foil and stored at 20° C., 65% relative humidity, for further strength measurements.

Mini-Slump Test:

The mini-slump test is a modified concrete slump test for small volumes of concrete, which allows the precise prediction of the results of standardized concrete slump test DIN EN 12350-2. For the mini-slump test, a modified mini-slump cone is used, which represents a "half" of a standard Abrams cone (truncated cone with dimensions 50, 100 and 150 mm of upper inner diameter, lower inner diameter and height). This cone is placed on a flat plate, filled with fresh concrete mix in two stages of approximately equal volume and each layer is tamped 15 times. Subsequently, the upper concrete surface is levelled, and then the cone is removed and the slump (the difference between the height of the cone and the height of the resulting concrete heap) is recorded.

This test is repeated as frequently as needed (in this case every 15 to 30 min) to assess the slump retention of the mixes. For each repeated slump test the concrete mix is premixed with a Hobart mixer for 1 min at speed 1.

Figure 1B:
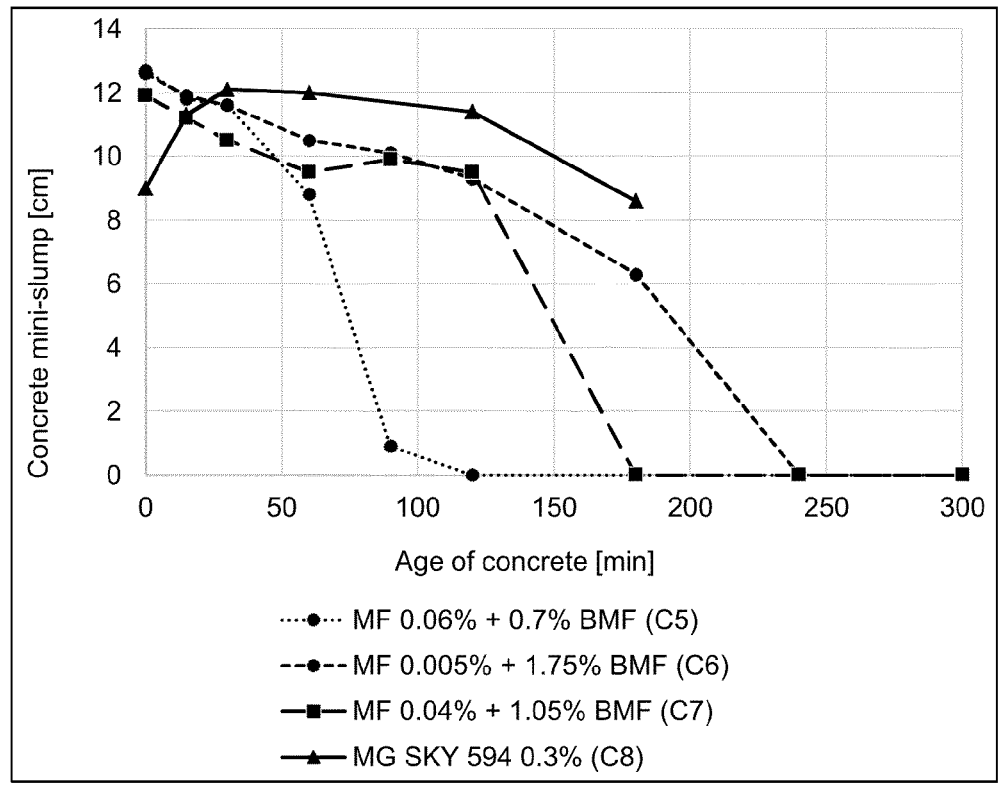
Figure 2A:
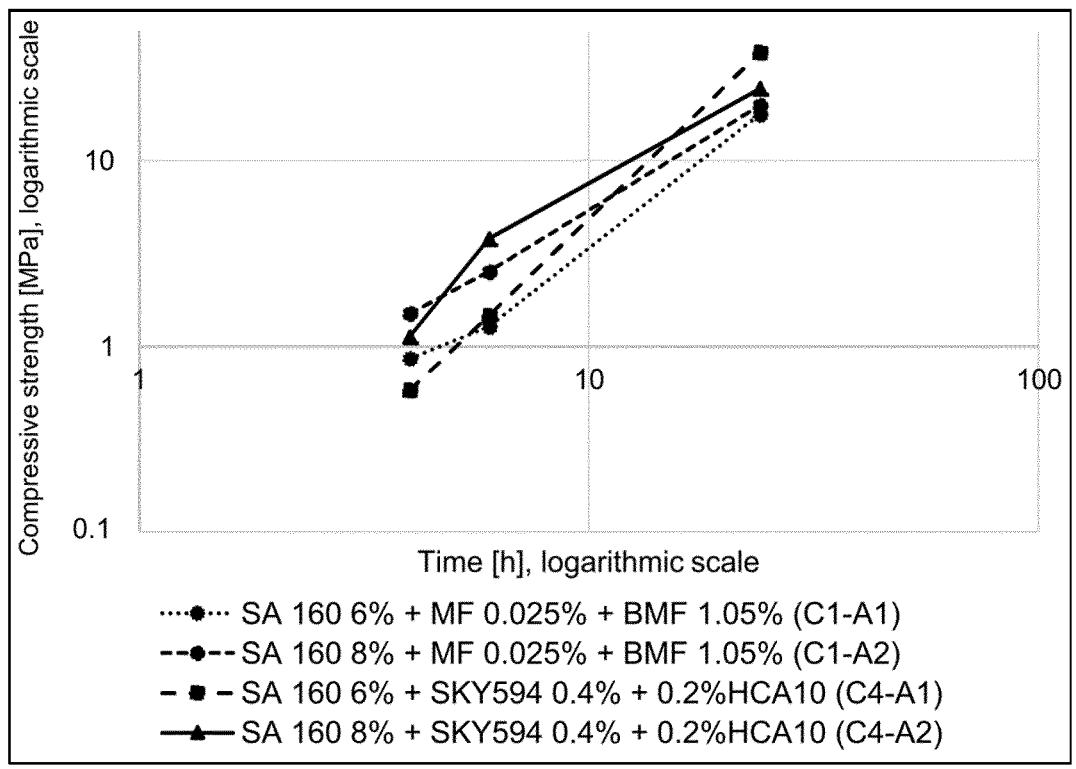
FIGS. 2a and 2b show the experimental results of tests for determining the compressive strength of concrete mixes.
Figure 2B:
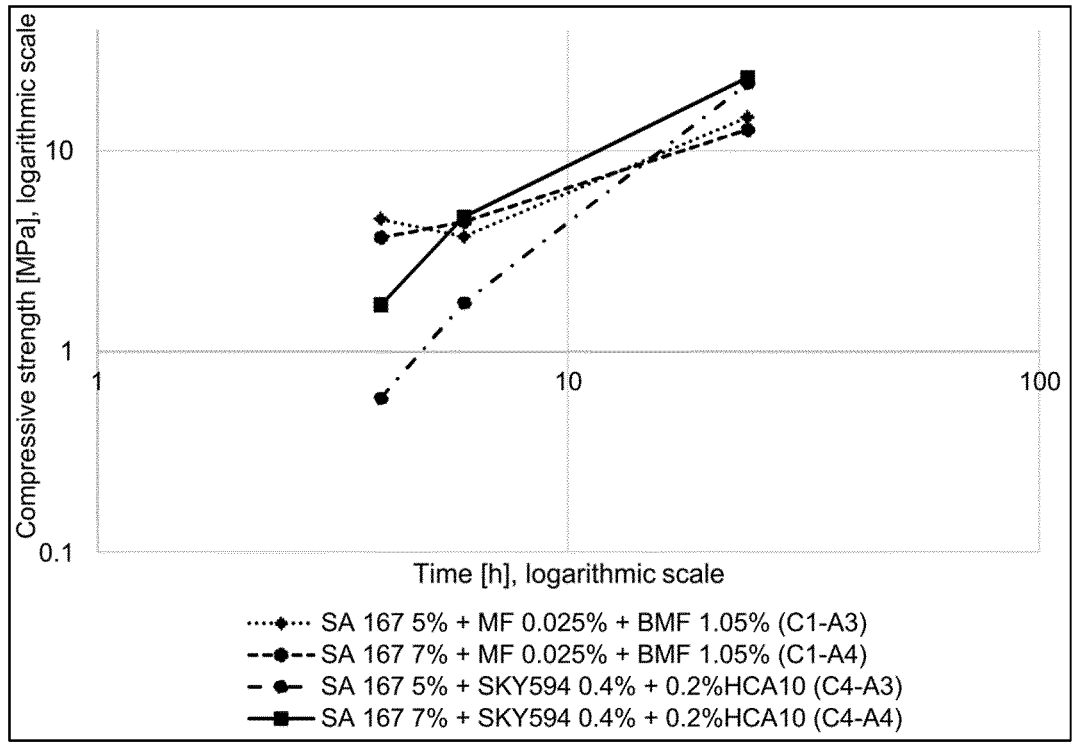
Figure 3A:
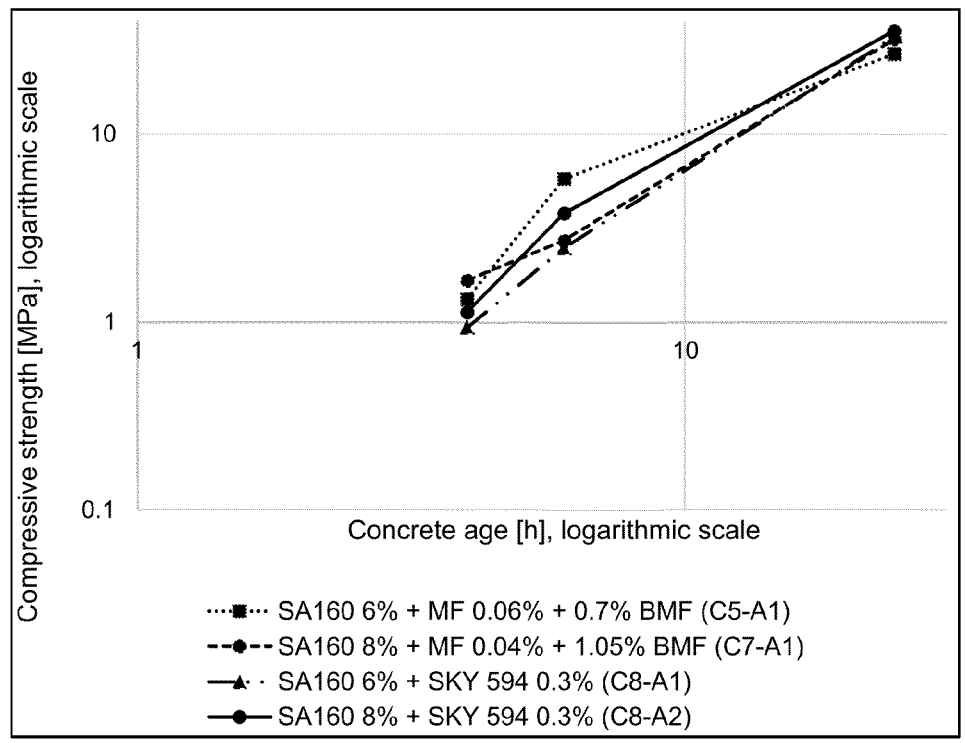
FIGS. 3a and 3b show the experimental results of tests for determining the compressive strength of further concrete mixes.
Figure 3B:
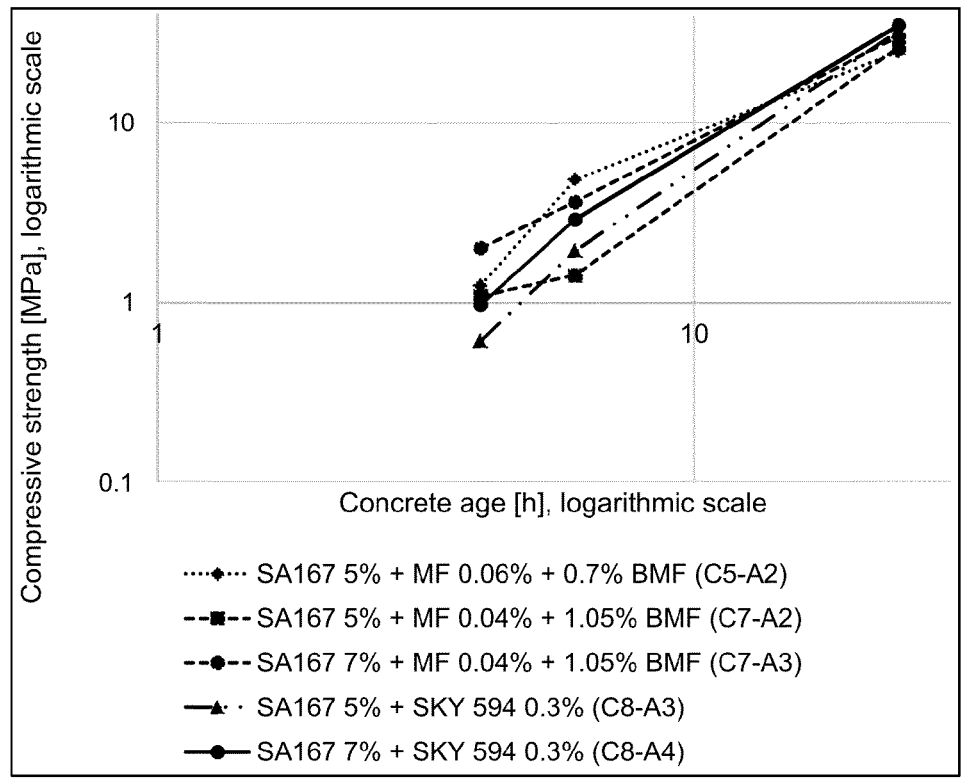

FIG. 1a shows the mini-slump test results of concrete mixes C1 to C4. FIG. 1b shows the mini-slump test results of concrete mixes C5 to C8. The dosage of ettringite controller was varied in both cement types to investigate its effect on slump retention, as well as strength development in the presence of accelerators. The initial slump of the mixes was adjusted to the same initial value by adjusting the dosage of plasticizers, so as to allow for comparability of the mixes.

It is evident that the concrete mixes comprising ettringite formation controllers of the invention show a sufficiently long open time, which can be adjusted to the desired value by dosage variation of ettringite controller.

Furthermore, it was found that visually, the concrete mixes comprising ettringite formation controllers of the invention, both with and without accelerator, are initially less viscous than the comparative concrete mixes without ettringite formation controllers, indicating a higher degree of pumpability and sprayability.

Accelerators were added to concrete mixes as prepared above ("accelerated concrete mixes") according to the following tables.

| | Accelerated Concrete Mix | | | | | | | |
|---|---|---|---|---|---|---|---|---|
| | C1-A1 | C1-A2 | C4-A1 ** | C4-A2 ** | C1-A3 | C1-A4 | C4-A3 ** | C4-A4 ** |
| Components of Concrete Mix | | | | | | | | |
| | C1 | C1 | C4 | C4 | C1 | C1 | C4 | C4 |
| Further Components [wt.-%] * | | | | | | | | |
| Accelerator (SA 160) | 6 | 8 | 6 | 8 | — | — | — | — |
| Accelerator (SA 167) | — | — | — | — | 5 | 7 | 5 | 7 |

| | Accelerated Concrete Mix | | | | | | | |
|---|---|---|---|---|---|---|---|---|
| | C5-A1 | C7-A1 | C8-A1 ** | C8-A2 ** | C5-A2 | C7-A2 | C7-A3 | C8-A3 ** | C8-A4 ** |
| Components of Concrete Mix | | | | | | | | | |
| | C5 | C7 | C8 | C8 | C5 | C7 | C7 | C8 | C8 |
| Further Components [wt.-%] * | | | | | | | | | |
| Accelerator (SA 160) | 6 | 8 | 6 | 8 | — | — | — | — | — |
| Accelerator (SA 167) | — | — | — | — | 5 | 5 | 7 | 5 | 7 |

* wt.-% of aqueous solution relative to the weight of cement (bwoc)
** comparative example The compressive strength of the prepared prisms comprising accelerated concrete mixes was measured after 4, 6 and 24 h according to the norm DIN EN 206-1/DIN 1045-2. By using a ZWICK 1446 machine, each prism was broken into two equal pieces. Thus, two values could be obtained for each prism.

The results are shown in FIGS. 2a, 2b, 3a and 3b. It is evident that the concrete mixes comprising ettringite formation controller of the invention show significantly higher early strength than the corresponding comparative concrete mixes, which is particularly relevant for earlier re-entry time in mines and tunnels, and under difficult working conditions like unstable ground, where fast rates of advance are required, or if thick layers have to be sprayed overhead.

C.2)—Mortar Tests

Mortar mixes M1 to M12 with compositions according to the following tables were prepared.

| | Mortar Mix | | | | | |
|---|---|---|---|---|---|---|
| Component | M1 | M2 | M3 * | M4 * | M5 | M6 * |
| Cement [g] (2:1(w/w) Eiberg CEMI 52,5N:Fluasit) | 836 | 836 | 836 | 836 | — | — |
| Cement [g] (Mergelstetten CEMI 52,5R) | — | — | — | — | 836 | 836 |
| Norm sand [g] (DIN EN196-1) | 1350 | 1350 | 1350 | 1350 | 1350 | 1350 |
| Plasticizer [wt.-%]** (MG SKY 594) | — | — | 0.4 | 0.4 | — | 0.3 |
| Plasticizer [wt.-%]** (Melflux 6680 L) | 0.025 | 0.025 | — | — | 0.04 | — |
| Accelerator [wt.-%]*** (SA 160) | — | 8 | — | 8 | — | — |
| Accelerator [wt.-%]*** (SA 167) | 7 | — | 7 | — | 7 | 7 |
| Hydration control additive [wt.-%]*** (MasterRoc HCA 10) | — | — | 0.2 | 0.2 | — | — |
| Ettringite formation controller [wt.-%]** (BMF) | 1.05 | 1.05 | — | — | 1.05 | — |
| Water [g] (total amount) | 376.2 | 376.2 | 376.2 | 376.2 | 376.2 | 376.2 |

* comparative example
**wt.-% of the sum of solids of active components relative to the weight of cement (bwoc)
***wt.-% of aqueous solution relative to the weight of cement (bwoc)

|  | Mortar Mix | | | | | |
| --- | --- | --- | --- | --- | --- | --- |
| Component | M7 | M8 * | M9 * | M10 | M11 * | M12 * |
| Cement [g] (2:1(w/w) Eiberg CEMI 52,5N:Fluasit) | 836 | 836 | 836 | — | — | — |
| Cement [g] (Mergelstetten CEMI 52,5R) | — | — | — | 836 | 836 | 836 |
| Norm sand [g] (DIN EN196-1) | 1350 | 1350 | 1350 | 1350 | 1350 | 1350 |
| Plasticizer [wt.-%]** (Melflux 6680 L) | 0.025 | 0.025 | 0.025 | 0.04 | 0.04 | 0.04 |
| Accelerator [wt.-%]*** (SA 167) | 7 | — | — | 7 | — | — |
| Accelerator [wt.-%]*** (sodium aluminate) | — | 7 | — | — | 7 | — |
| Accelerator [wt.-%]*** (sodium silicate) | — | — | 7 | — | — | 7 |
| Ettringite formation controller [wt.-%]** (BMF) | 1.05 | 1.05 | 1.05 | 1.05 | 1.05 | 1.05 |
| Water [g] (total amount) | 372.6 | 372.6 | 372.6 | 372.6 | 372.6 | 372.6 |

\* comparative example
\*\*wt.-% of the sum of solids of active components relative to the weight of cement (bwoc)
\*\*\*wt.-% of aqueous solution relative to the weight of cement (bwoc)

Mortar mixes M1 to M6 were obtained similarly to the concrete mixes described above, however the difference in the composition is that these mortar mixes do not comprise aggregates in the range of 2 to 5 mm, so as to enable the measurement of penetration resistance force using an electronic sprayed concrete penetrometer (Mecmesin AFG 500N) equipped with a 1.6 mm needle.

Mixing and Measurement Procedure:

All the components except the accelerator were mixed for 3.5 min, having the same initial consistency and being prepared in equally big buckets. Afterwards, the accelerators were added and the mixes were further mixed for 40 seconds, and the obtained accelerated mortar mixes were compacted in the buckets to create a smooth flat surface. The penetration resistance force of a needle (diameter of 1.6 mm) into the mortar mixes from the upper smoothened surface was measured over a period of 6 min to 6 h (10 measurements for each point of time to calculate an average), starting from the addition of the accelerators using the above-mentioned penetrometer (Mecmesin AFG 500N). The results of the penetration resistance force measurements directly correlate with the strength of the mortar mixes and can be used as a prediction for corresponding big scale concrete tests. The measurement results are shown in FIGS. 4a, 4b, 5a and 5b.

Figure 4A:
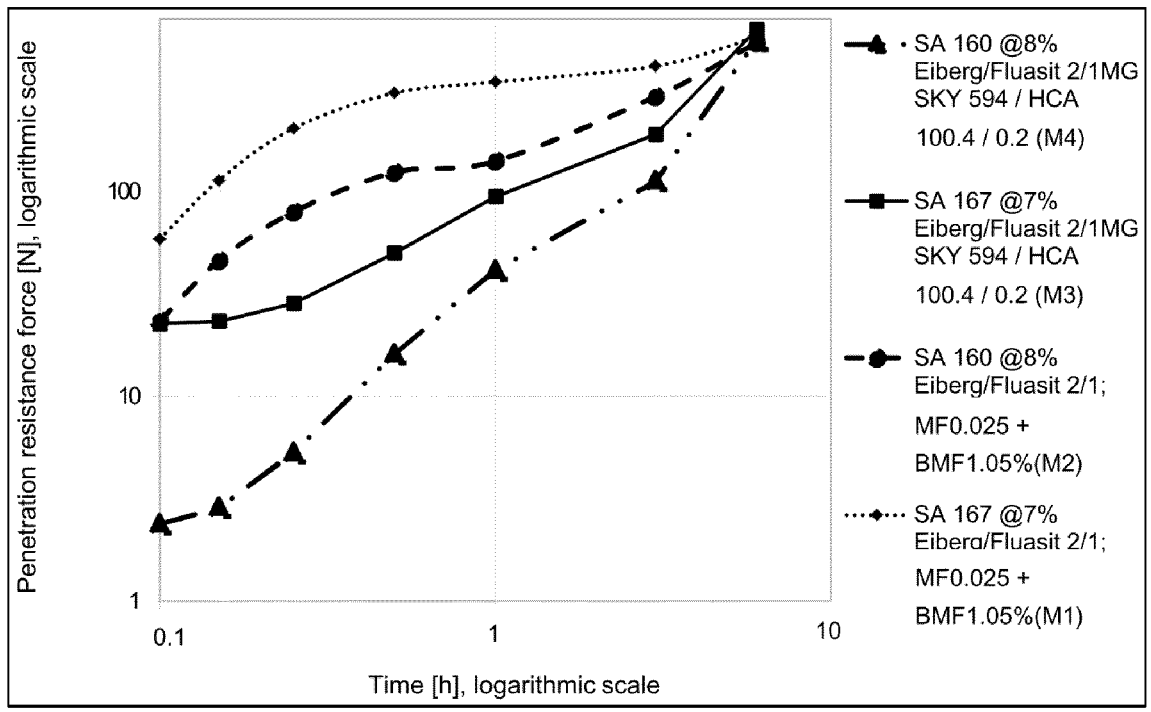
FIGS. 4a and 4b show the experimental results of tests for determining the penetration resistance force of mortar mixes.

FIG. 4a shows the results for mortar mixes M1 to M4 comprising the 2:1(w/w) Eiberg CEMI 52,5N:Fluasit cement. The comparison of M1 to M3 shows that in the presence of alkali-free accelerator SA 167, the mortar mixes comprising ettringite formation controller of the invention shows significantly higher early (6 min to 6 h) strength than the mortar mixes comprising reference hydration control additive HCA 10. The comparison of M2 to M4 shows that this effect is also observed in the presence of alkali-free accelerator SA 160.

Figure 4B:
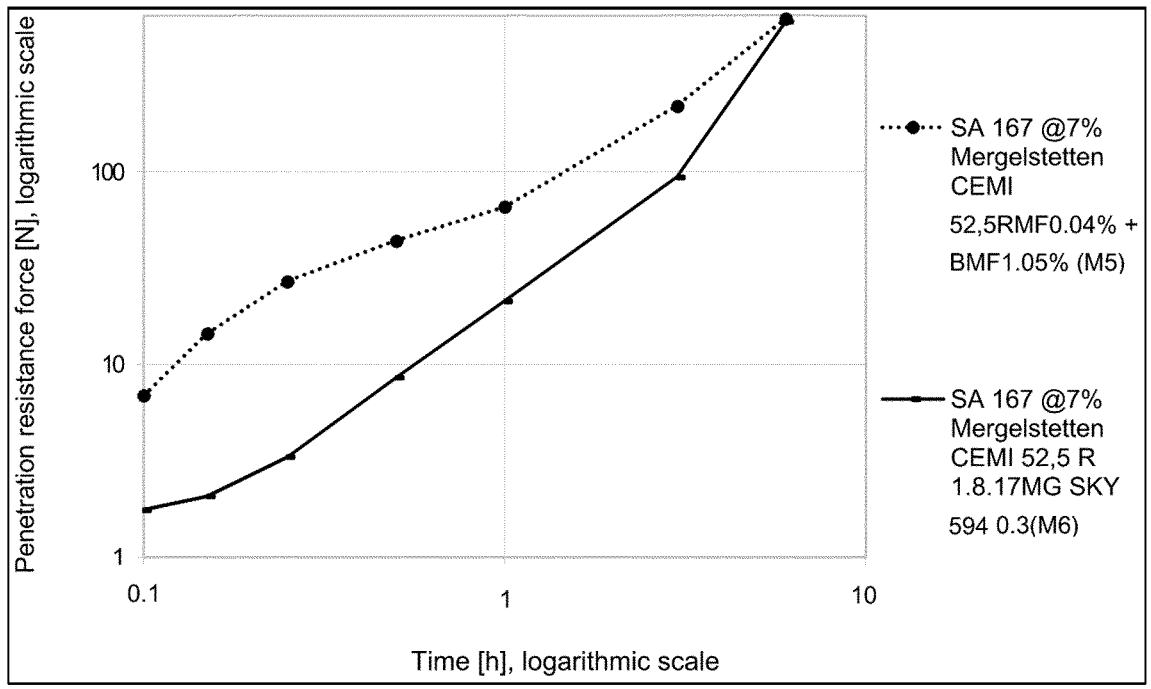

FIG. 4b shows the results for mortar mixes M5 and M6 comprising Mergelstetten CEMI 52,5R cement. It is again evident that in the presence of alkali-free accelerator SA 167, the mortar mix comprising ettringite formation controller of the invention shows significantly higher early (6 min to 6 h) strength than the mortar mix comprising no ettringite formation controller.

Figure 5A:
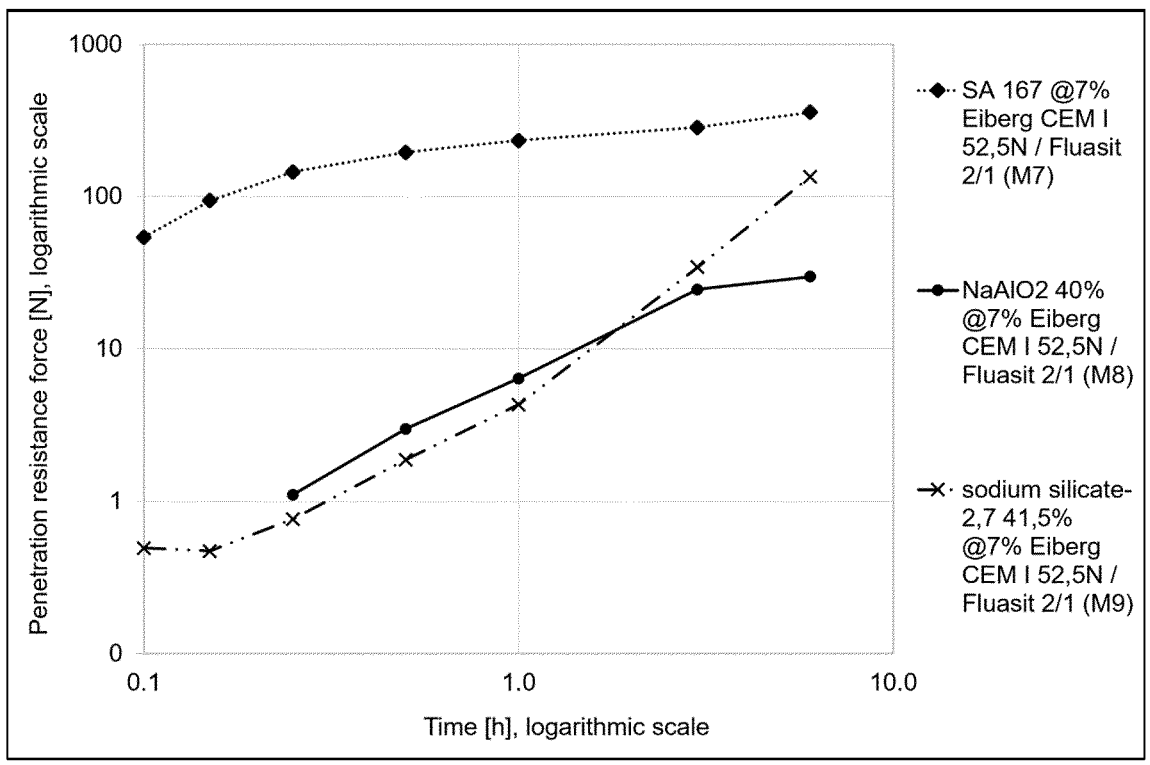
FIGS. 5a and 5b show the experimental results of tests for determining the penetration resistance force of further mortar mixes.

FIG. 5a shows the results for mortar mixes M7 to M9 comprising the 2:1(w/w) Eiberg CEMI 52,5N:Fluasit cement and ettringite formation controller BMF. It is evident that in the presence of alkali-free accelerator SA 167, the mortar mix shows significantly higher early (6 min to 6 h) strength than in the presence of alkali containing accelerators sodium aluminate and sodium silicate, respectively.

Figure 5B:
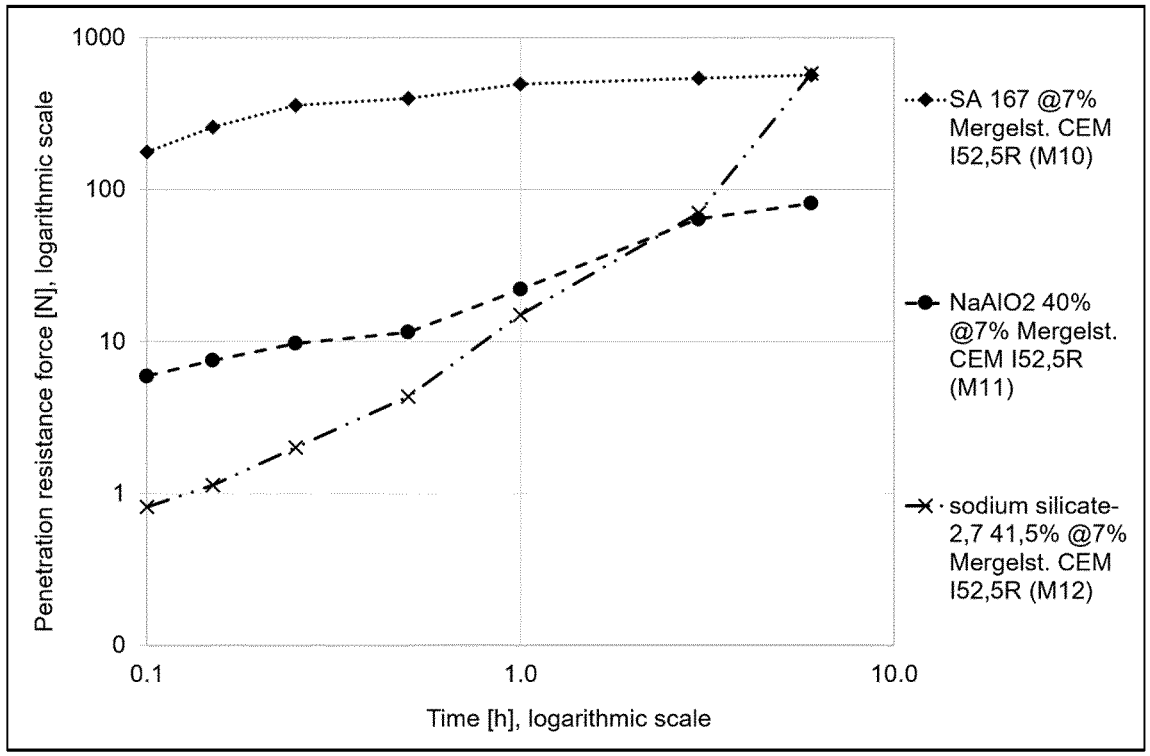

FIG. 5b shows the results for mortar mixes M10 to M12 comprising Mergelstetten CEMI 52,5R cement and ettringite formation controller BMF. It is again evident that in the presence of alkali-free accelerator SA 167, the mortar mix shows significantly higher early (6 min to 6 h) strength than in the presence of alkali containing accelerators sodium aluminate and sodium silicate, respectively.

The invention claimed is:

1. A shotcrete composition comprising:
   a) a cementitious binder;
   b) an ettringite formation controller comprising (i) an amine-glyoxylic acid condensate; and
   c) an alkali-free, aluminum-based shotcrete accelerator selected from aluminum salts, aluminum complexes, aluminum hydroxides, and mixtures thereof;
   wherein the shotcrete composition has a strength as measured by a penetration resistance force at 6 minutes to 6 hours.

2. The composition according to claim 1, wherein the amine-glyoxylic acid condensate is at least one of a melamine-glyoxylic acid condensate, a urea-glyoxylic acid condensate, a melamine-urea-glyoxylic acid condensate, or a polyacrylamide-glyoxylic acid condensate.

3. The composition according to claim 1, wherein the ettringite formation controller additionally comprises (ii) a carbonate source.

4. The composition according to claim 3, wherein the carbonate source is selected from inorganic carbonates having an aqueous solubility of 0.1 $gL^{-1}$ or more, organic carbonates, and mixtures thereof.

5. The composition according to claim 4, wherein the inorganic carbonate is selected from the group consisting of sodium carbonate, lithium carbonate and magnesium carbonate; and the organic carbonate is selected from the group consisting of ethylene carbonate and propylene carbonate.

6. The composition according to claim 1, wherein the ettringite formation controller additionally comprises (iii) a component selected from
polycarboxylic acids or salts thereof whose milliequivalent number of carboxyl groups is 5.00 meq/g or higher; and
α-hydroxy carboxylic acids or salts thereof.

7. The composition according to claim 6, wherein the polycarboxylic acid is selected from phosphonoalkyl carboxylic acids, amino carboxylic acids, and polymeric carboxylic acids.

8. The composition according to claim 6, wherein the component is selected from:
polycarboxylic acids or salts thereof whose milliequivalent number of carboxyl groups is 5.00 to 15.00 meq/g; and
α-hydroxy carboxylic acids or salts thereof.

9. The composition according to claim 1, wherein the cementitious binder is selected from Portland cement, calcium aluminate cement, sulfoaluminate cement, or combinations thereof.

10. The composition according to claim 1, wherein the composition additionally comprises a latent hydraulic binder or a pozzolanic binder, or mixtures thereof.

11. The composition according to claim 1, additionally comprising a dispersant.

12. The composition according to claim 11, wherein the dispersant is selected from the group of
comb polymers having a carbon-containing backbone to which are attached pendant cement-anchoring groups and polyether side chains,
non-ionic comb polymers having a carbon-containing backbone to which are attached pendant hydrolysable groups and polyether side chains, the hydrolysable groups upon hydrolysis releasing cement-anchoring groups,
sulfonated melamine-formaldehyde condensates,
lignosulfonates,
sulfonated ketone-formaldehyde condensates,
sulfonated naphthalene-formaldehyde condensates,
phosphonate containing dispersants,
phosphate containing dispersants, and
mixtures thereof.

13. The composition according to claim 1, wherein the composition exhibits superior early strength, as compared to the composition without b) ettringite formation controller comprising (i) an amine-glyoxylic acid condensate.

14. A process comprising:
providing a cementitious composition comprising a) a cementitious binder, and b) an ettringite formation controller comprising (i) an amine-glyoxylic acid condensate;
admixing an alkali-free, aluminum-based shotcrete accelerator selected from aluminum salts, aluminum complexes, aluminum hydroxides, and mixtures thereof to the cementitious composition to obtain a shotcrete composition; and
applying the shotcrete composition onto a surface to obtain a shotcrete structure and allowing the shotcrete structure to harden.

15. A hardened shotcrete structure obtained by the process according to claim 14.

* * * * *